United States Patent
Brueckner et al.

(10) Patent No.: US 10,491,387 B2
(45) Date of Patent: Nov. 26, 2019

(54) END-TO-END ENCRYPTION OF A BLOCK STORAGE DEVICE WITH PROTECTED KEY

(71) Applicant: INTERNATIONAL BUSINESS MACHINES CORPORATION, Armonk, NY (US)

(72) Inventors: Hendrik S. Brueckner, Holzgerlingen (DE); Reinhard T. Buendgen, Tuebingen (DE); Harald Freudenberger, Fellbach (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 15/351,546

(22) Filed: Nov. 15, 2016

(65) Prior Publication Data
US 2018/0139046 A1 May 17, 2018

(51) Int. Cl.
| | | |
|---|---|---|
| *H04L 9/08* | (2006.01) | |
| *G06F 21/78* | (2013.01) | |
| *H04L 9/14* | (2006.01) | |
| *G06F 21/62* | (2013.01) | |
| *G06F 21/60* | (2013.01) | |

(Continued)

(52) U.S. Cl.
CPC .............. *H04L 9/0897* (2013.01); *G06F 1/14* (2013.01); *G06F 21/10* (2013.01); *G06F 21/602* (2013.01); *G06F 21/6218* (2013.01); *G06F 21/78* (2013.01); *H04L 9/0822* (2013.01); *H04L 9/14* (2013.01); *H04L 2209/603* (2013.01); *H04L 2463/101* (2013.01)

(58) Field of Classification Search
CPC ........ H04L 9/14; H04L 9/0822; G06F 21/602; G06F 21/6218
See application file for complete search history.

(56) References Cited

U.S. PATENT DOCUMENTS

| | | | |
|---|---|---|---|
| 8,245,037 B1 * | 8/2012 | Durgin | G06F 21/602 380/286 |
| 8,392,727 B2 | 3/2013 | Danilak | |
| 8,509,449 B2 | 8/2013 | Ureche et al. | |

(Continued)

OTHER PUBLICATIONS

Archwiki "Disk encryption", downloaded from URL: https://wiki.archlinux.org/index.php/disk_encryption; retrieved on Sep. 6, 2016; 20 pgs.

(Continued)

*Primary Examiner* — James R Turchen
(74) *Attorney, Agent, or Firm* — Cantor Colburn LLP; Noah Sharkan

(57) ABSTRACT

A method for protecting an encryption key for a block storage device is provided. The includes reading from a superblock of the block storage device a secure key, referring to a clear key only accessible by a hardware security module, and a type indicator indicating that the secure key refers to the clear key which is only accessible by the hardware security module. The method also includes associating the block storage device with the hardware security module and converting the secure key into a protected clear key using the hardware security module, wherein the protected key refers to the clear key accessible by a central processing unit of a related computer system.

18 Claims, 8 Drawing Sheets

(51) Int. Cl.
*G06F 1/14* (2006.01)
*G06F 21/10* (2013.01)

(56) References Cited

U.S. PATENT DOCUMENTS

| | | | | |
|---|---|---|---|---|
| 8,511,544 | B1* | 8/2013 | Billett | G06F 21/57 |
| | | | | 235/379 |
| 9,037,870 | B1* | 5/2015 | Zheng | G06F 12/1408 |
| | | | | 380/273 |
| 9,098,712 | B2 | 8/2015 | Carter et al. | |
| 9,251,382 | B2 | 2/2016 | Astigarraga et al. | |
| 9,379,890 | B1* | 6/2016 | Blakely | H04L 9/0822 |
| 9,413,730 | B1* | 8/2016 | Narayan | H04L 63/0471 |
| 9,686,072 | B2* | 6/2017 | Fedronic | G06F 21/602 |
| 9,794,063 | B2* | 10/2017 | Yellepeddy | G06F 21/79 |
| 9,806,887 | B1* | 10/2017 | Campagna | H04L 9/0637 |
| 10,187,203 | B2* | 1/2019 | Hamel | H04L 9/0822 |
| 2003/0182566 | A1* | 9/2003 | Kohara | H04L 63/06 |
| | | | | 713/193 |
| 2008/0028448 | A1* | 1/2008 | Tsuchitoi | G06F 3/1214 |
| | | | | 726/6 |
| 2009/0220090 | A1* | 9/2009 | Savagaonkar | G06F 21/10 |
| | | | | 380/277 |
| 2010/0280996 | A1* | 11/2010 | Gross, IV | G06F 16/188 |
| | | | | 707/649 |
| 2011/0191599 | A1* | 8/2011 | Chou | G06F 12/14 |
| | | | | 713/193 |
| 2011/0246784 | A1 | 10/2011 | Hobbett et al. | |
| 2011/0252071 | A1* | 10/2011 | Cidon | G06F 16/178 |
| | | | | 707/802 |
| 2011/0283113 | A1* | 11/2011 | Moffat | G06F 21/602 |
| | | | | 713/189 |
| 2014/0177842 | A1* | 6/2014 | Yellepeddy | G06F 21/79 |
| | | | | 380/277 |
| 2014/0380054 | A1* | 12/2014 | Roth | H04L 9/0822 |
| | | | | 713/171 |
| 2015/0006890 | A1* | 1/2015 | Roth | G06F 21/6254 |
| | | | | 713/165 |
| 2015/0271150 | A1* | 9/2015 | Barnett | G06F 16/23 |
| | | | | 713/171 |
| 2016/0006564 | A1 | 1/2016 | Glider et al. | |
| 2016/0323250 | A1* | 11/2016 | Winter | H04L 63/0428 |
| 2017/0060924 | A1* | 3/2017 | Fitzhardinge | G06F 16/2246 |
| 2018/0062835 | A1* | 3/2018 | Hamel | H04L 9/0822 |

OTHER PUBLICATIONS

Pal, et al., "Enhanding File Data Security in Linux Operating System by Integrating Secure File System" IEEE 2009, downloaded from http://www.cse.iitd.emet.in/~rkpal/Secure%20File%20System.pdf; 8 pgs.

\* cited by examiner 100 method

```
┌─────────────────────────────────────────────┐
│ 102   reading from a superblock             │
│       of the block storage device           │
│       a secure key and a type indicator     │
└─────────────────────────────────────────────┘
```

```
┌─────────────────────────────────────────────┐
│ 104   associating the block storage device  │
│       with the hardware security module     │
└─────────────────────────────────────────────┘
```

```
┌─────────────────────────────────────────────┐
│ 106   converting the secure key into a protected key │
└─────────────────────────────────────────────┘
```

END-TO-END ENCRYPTION OF A BLOCK STORAGE DEVICE WITH PROTECTED KEY

FIELD OF THE INVENTION

The invention relates generally to a method for protecting an encryption key, and more specifically, to a method for protecting an encryption key for a block storage device, e.g., in a UNIX environment. The invention relates further to a system for protecting an encryption key for a block storage device, and a computer program product.

BACKGROUND

Protecting data in data processing environments becomes increasingly important in data centers. With the rise of cloud computing environments, the need to protect data against unauthorized access is paramount for these more and more dominant computing architectures. Typically, data are stored on devices which store the data in blocks of data, i.e., block devices. Today, the data are often stored in an encrypted form. For this, an effective encryption/decryption key may be used which may also in encrypted form be stored on the block device. However, in order to read or write data from/to the block device in an encrypted form, it may be required to have the effective key available in the memory of the related computer system. This represents a security weakness besides the fact that the additional encryption/decryption for writing or reading to/from the block device represents an additional overhead for the computing system and thus, performance degradation.

It would be much safer for the data if the effective encryption key used is never being stored in operating system accessible memory an unencrypted form (i.e., in the clear). Additionally, the requirement for encryption operations at "CPU speed" should be met. Furthermore, it would be very helpful if the method used for protecting the data may not depend on specific system configurations.

Some end-to-end encryption methods are available today. However, they always have deficiencies either in terms of speed, special configuration requirements or compromises in terms of an accessibility of the clear key to the operating system and/or application.

SUMMARY

According to one aspect of the present invention, a computer-implemented method for protecting an encryption key for a block storage device is provided. The method includes reading from a superblock of the block storage device a secure key, which may refer to a clear key only accessible by a hardware security module, and a type indicator indicating that the secure key may refer to the clear key which may only be accessible by the hardware security module. The method includes associating the block storage device with the hardware security module, and converting the secure key into a protected clear key using the hardware security module, in which the protected key may refer to the clear key accessible by a central processing unit of a related computer system.

According to another aspect of the present invention, a system for protecting an encryption key for a block storage device may be provided. The system includes a reading unit adapted for reading from a superblock of the block storage device a secure key which may refer to a clear key only accessible by a hardware security module and a type indicator indicating that the secure key may refer to the clear key which may only be accessible by the hardware security module. Furthermore, the system includes an associating module adapted for associating the block storage device to the hardware security module and a conversion module adapted for converting the secure key into a protected clear key using the hardware security module. The protected key may refer to the clear key accessible by a central processing unit of a related computer system.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Embodiments of the invention will be described, by way of example only, and with reference to the following drawings:

FIG. 1 shows a block diagram of an embodiment of the inventive method for protecting an encryption key for a block storage device.

Figure 2:
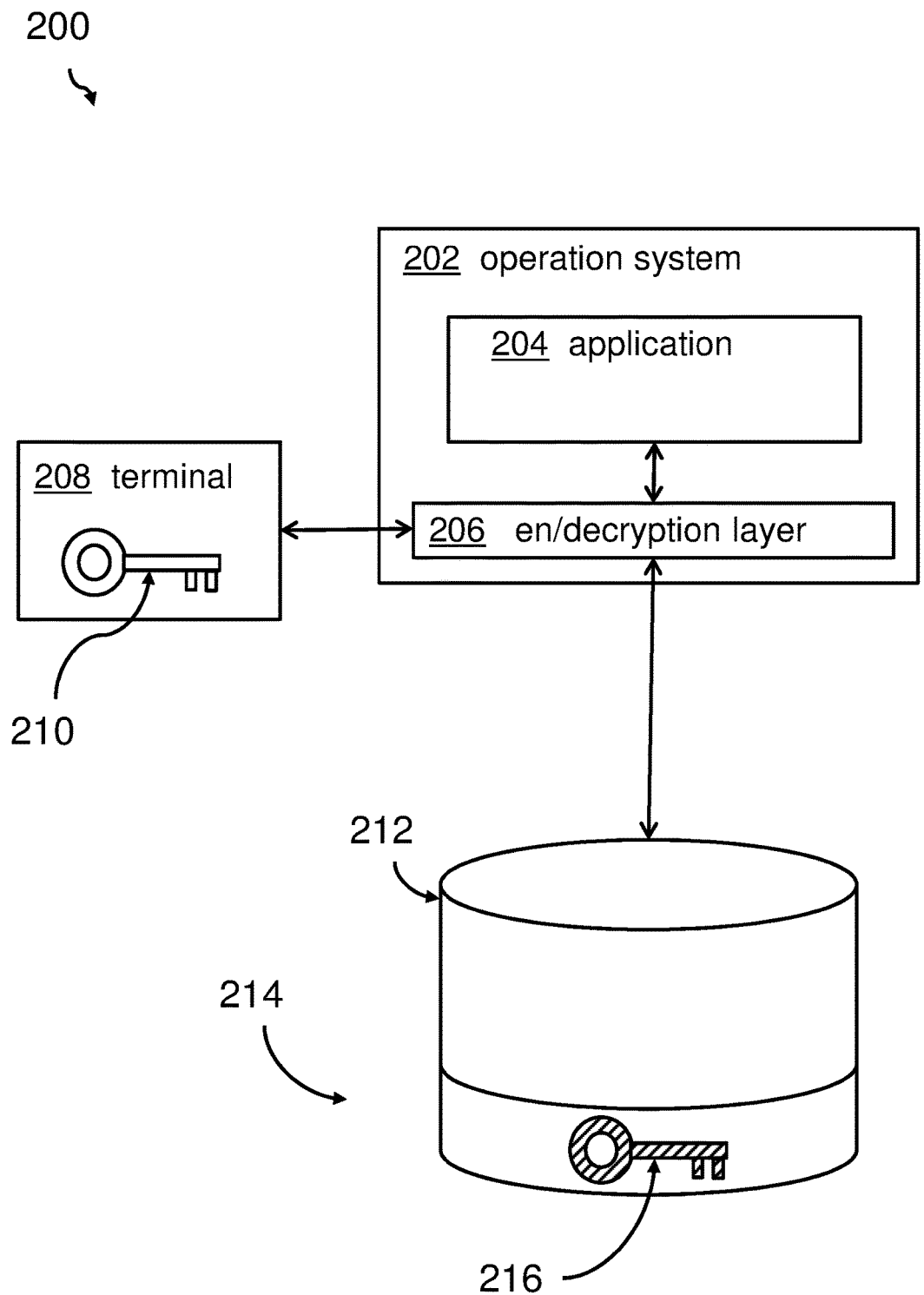
Figure 3:
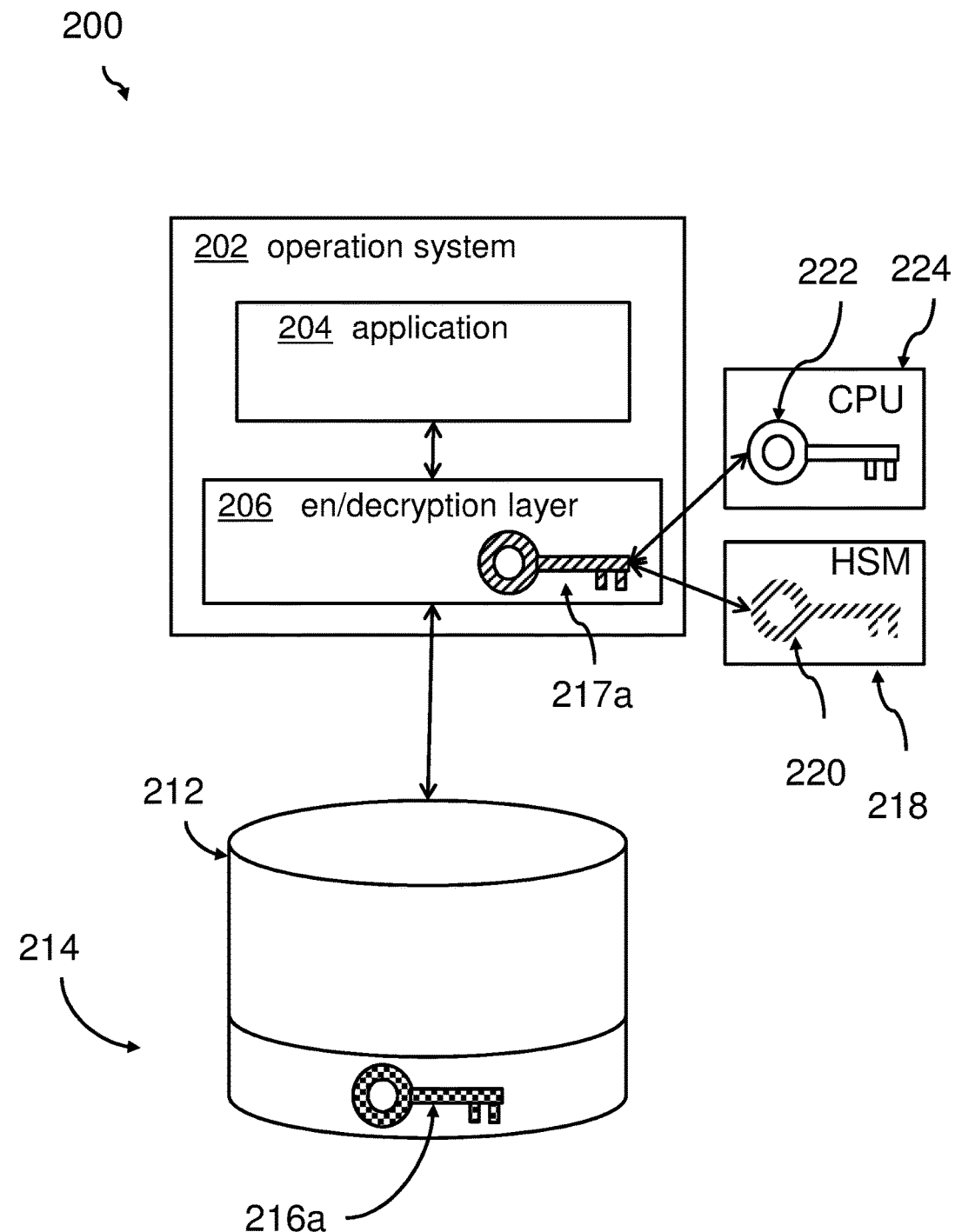

FIG. 2 shows a block diagram of an embodiment of a typical end-to-end data encryption method used for block storage devices FIG. 3 shows an implementation-near block diagram of an embodiment of the proposed method.

Figure 4:
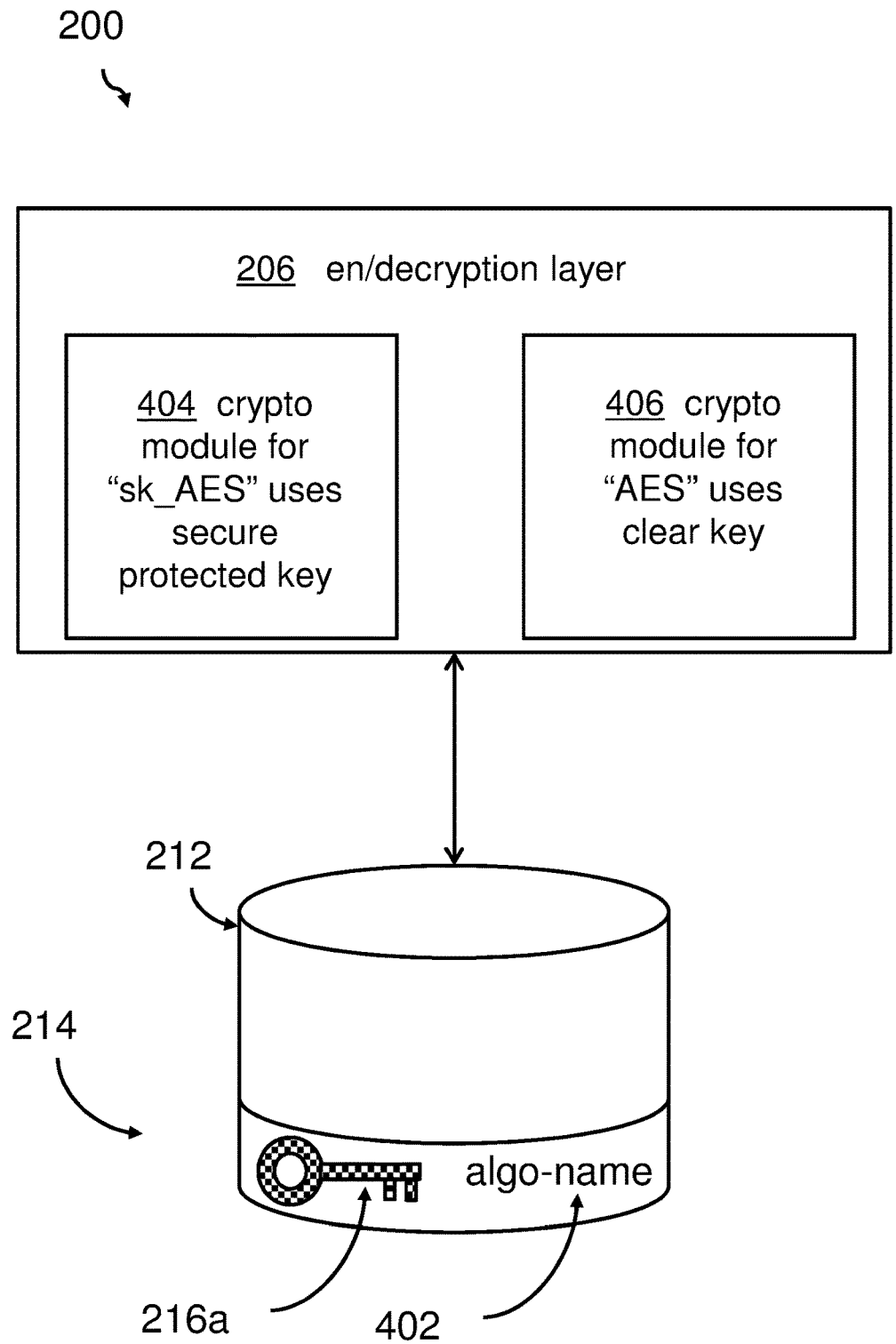

FIG. 4 shows a block diagram of an embodiment of an adapted encryption/decryption layer.

Figure 5:
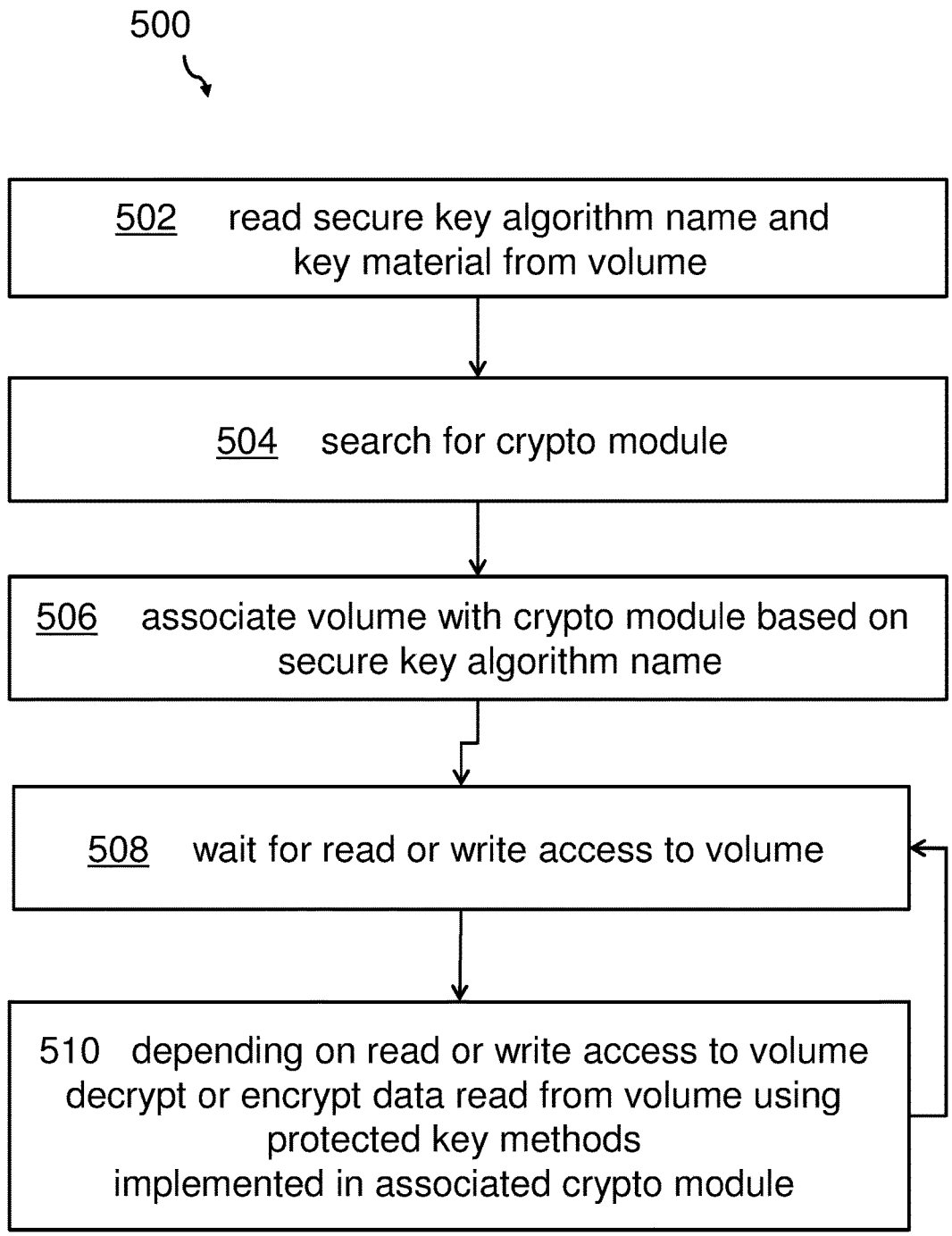

FIG. 5 shows another block diagram with steps useful for the proposed method.

Figure 6:
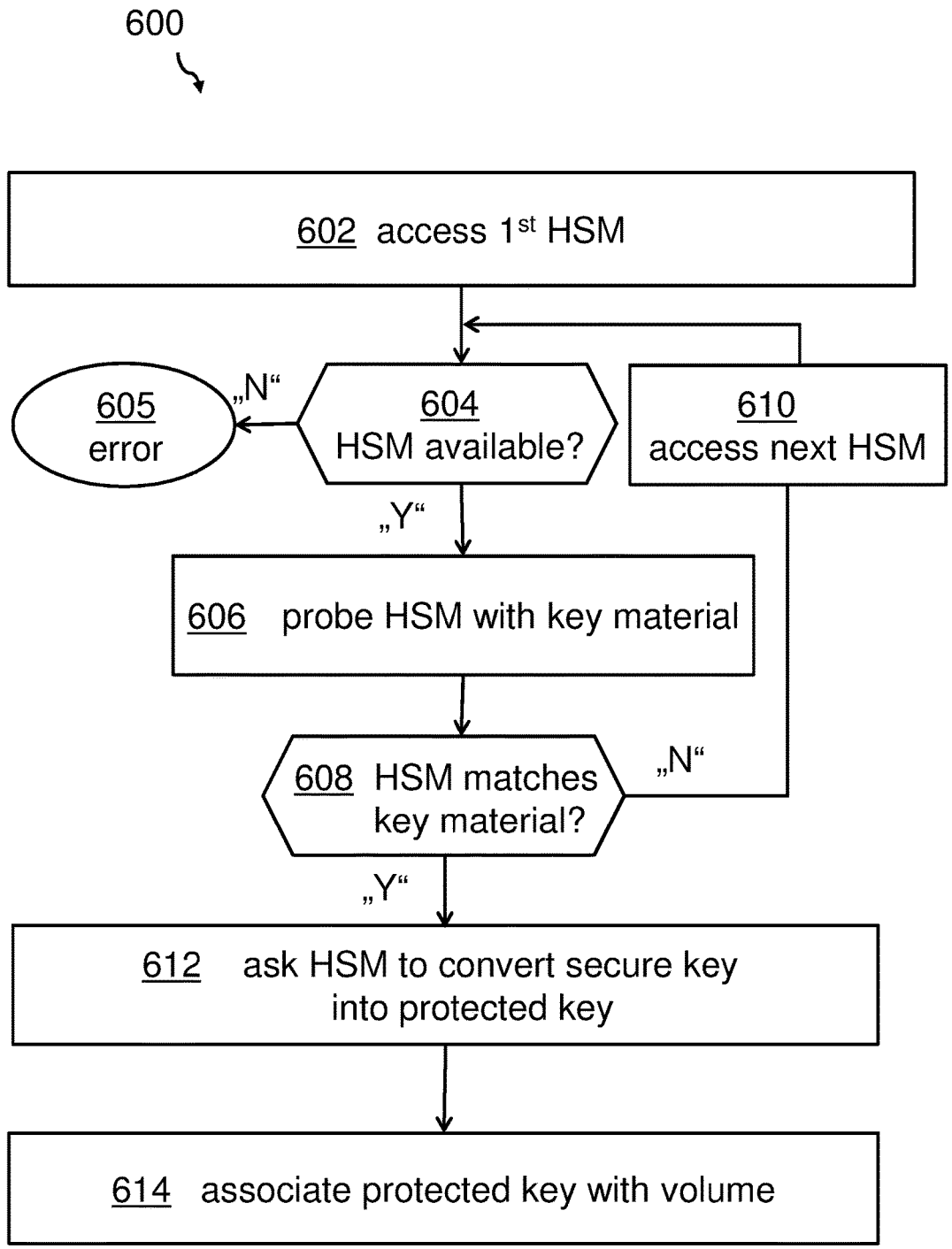

FIG. 6 shows a block diagram of an initialization process for the secure key algorithm module.

Figure 7:
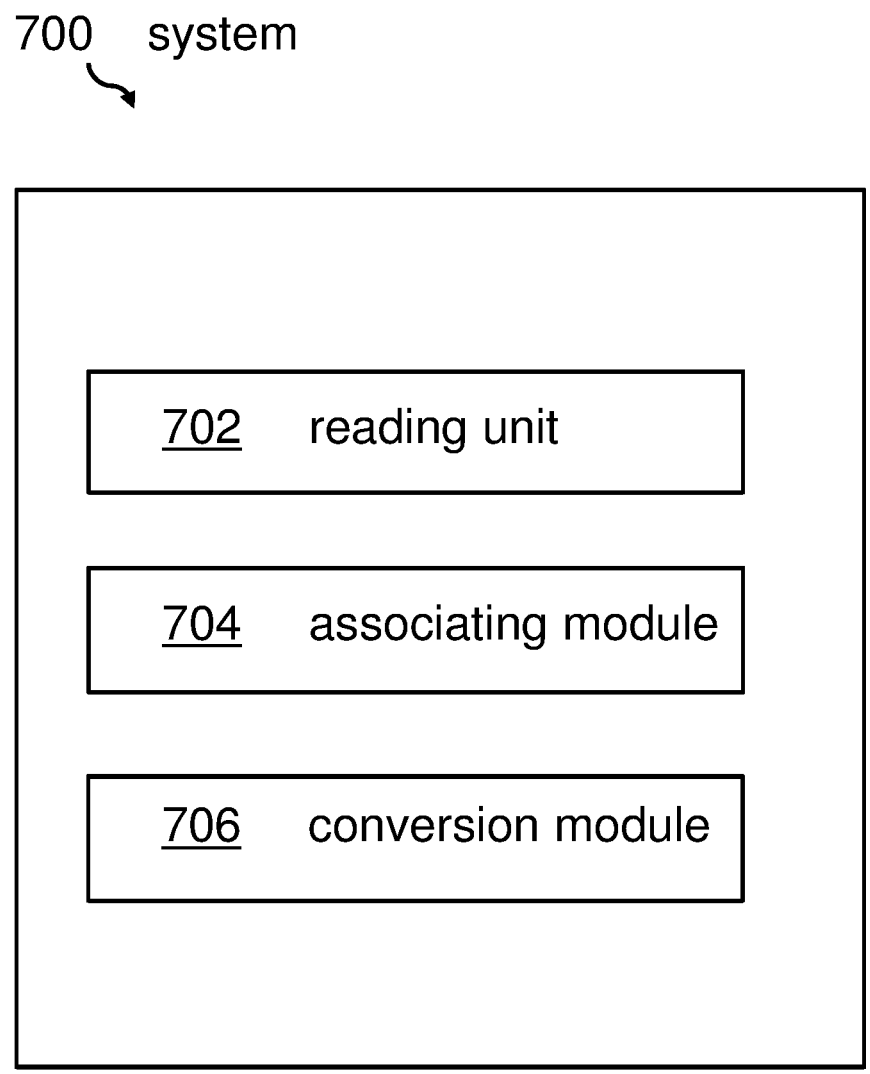

FIG. 7 shows a block diagram of a related system for protecting an encryption key for a block storage device.

Figure 8:
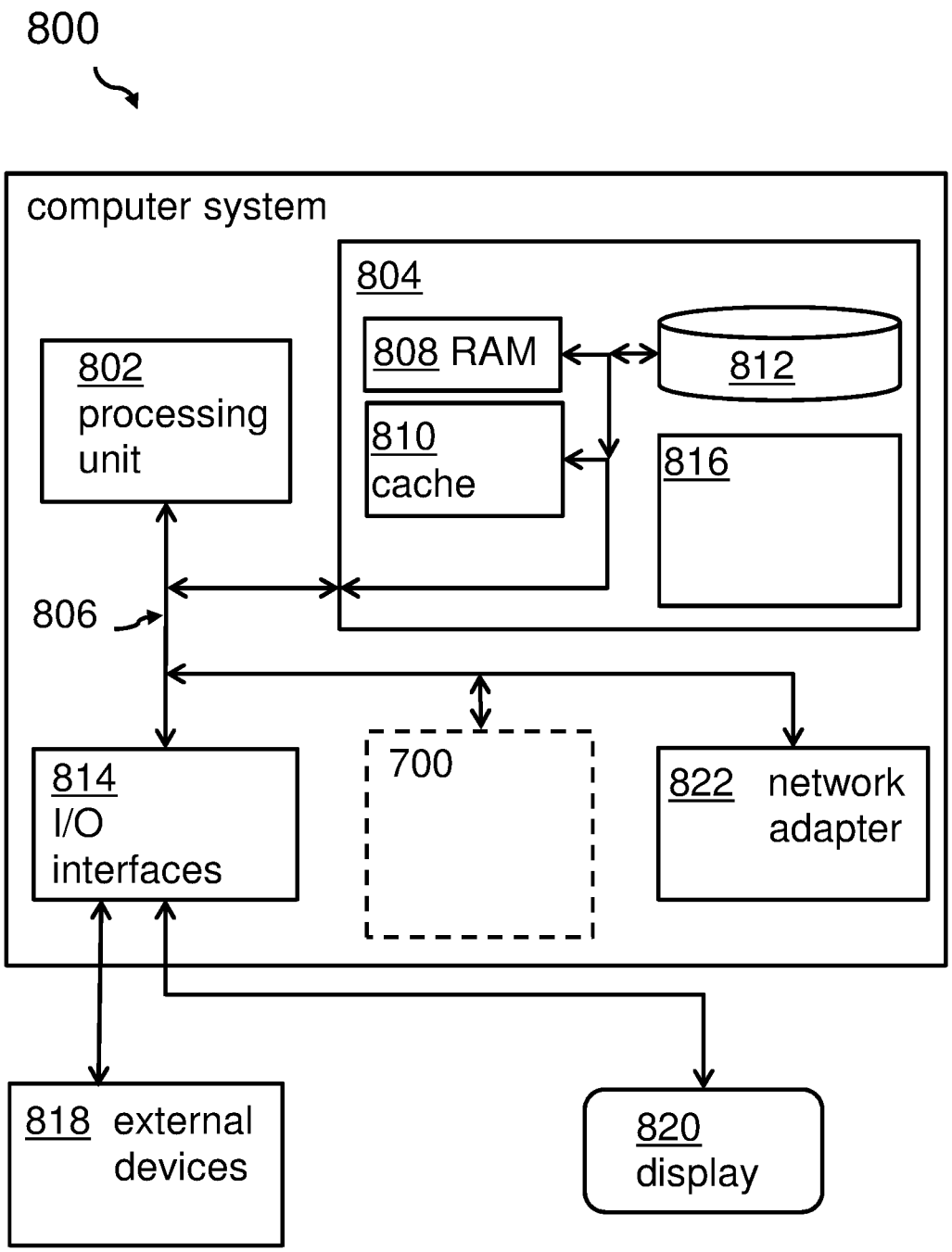

FIG. 8 shows a block diagram of an embodiment of a computing system comprising the system according to FIG. 7.

DETAILED DESCRIPTION

In the context of this description, the following conventions, terms and/or expressions may be used:

The term 'encryption key' may denote a string of bytes used as access key for protected data. The protected data may be protected by a cryptographic method. In this context, encryption may be the process of encoding messages or information in such a way that only authorized parties can read them, i.e., those having access to the encryption/decryption key. Encryption does not in itself prevent interception, but denies the message content to the interceptor. In an encryption scheme, the intended communication information or message, referred to as plaintext, is encrypted using an encryption algorithm, generating cipher-text that can only be interpreted if decrypted.

The term 'block storage device' may denote a storage device storing data in blocks of data. This may, for example, be a volume of a hard drive or, a disk in the form of a classical spinning disk or a solid-state disk storing data in the same block format as rotating disks. The block storage device may have at least two separate areas: a superblock for organizational data and other blocks for storing regular data.

The term 'secure key' may denote—in the context of this document—an encryption/decryption key stored in the superblock of the block storage device. The clear key referred to by the secure key may never be stored in the regular memory of the computer system.

The term 'clear key' may denote an encryption/decryption key in the clear thus, unprotected. If someone may have access to the clear key, he/she may decrypt the protected encrypted data.

The term 'hardware security module' (HSM) may denote a specific physical computing device that may safeguard and manage digital keys for strong authentication and encryption and may provide crypto-processing. These modules traditionally come in the form of a plug-in card or an external device that may be attached directly to a computer or network server.

The term 'type indicator' may denote a marker stored in the superblock of a block storage device indicating that the there stored key is a secure key requiring a related secure key algorithm executed on a dedicated hardware security module.

The term 'protected clear key' may denote an encryption/decryption key—in case of a symmetrical encryption/decryption—which refers to a clear key that may be protected by a master key only accessible by the CPU (central processing unit) of the computer system. The master key may be stored within the CPU or in a specific memory area only accessible by firmware of the CPU.

The term 'clear key read/write method' may denote an encryption/decryption method known by a skilled person. It may denote a method for protecting data to be stored on a disk. However, the clear key method may allow having the related clear key stored in the memory which may be accessible by the operating system.

The term 'protected key read/write method' may denote an encryption/decryption method. It may denote a method for protecting data to be stored on a disk. However, the protected key method may allow having the related clear key stored in the memory which may not be accessible by the operating system.

The term 'crypto module' may denote a software module as part of a decrypt/encrypt layer in the pathway between an application or the operating system and data stored on a block storage device. Known technologies comprise already a crypto module as part of the decrypt/encrypt layer. As part of the here proposed method and system an additional secure key crypto module may be implemented as part of the decrypt/encrypt layer in order to handle secure keys stored in the superblock of the block storage device. Hence, the decrypt/encrypt layer may be implemented as part of the computer system (hardware or firmware), as part of a related device driver or, as part of the operating system offering secure block storage device access services to an application.

The term 'secure key crypto module' may denote the just mentioned in additional crypto module enabled to handle secure keys stored as part of the superblock. It may be used as part of the clear key encryption/decryption methods.

The term 'standard crypto module' may denote the also just mentioned crypto module which may already be used as part of clear key encryption/decryption methods.

The proposed method for protecting an encryption key for a block storage device may offer multiple advantages and technical effects:

The proposed method and system combine each a series of characteristics useful and required for securely storing data on block storage devices, like disks, volumes, etc. It basically provides an end-to-end encryption method for block devices. The effective or clear key used to encrypt the data on the disk is never loaded into the memory in the clear. Thus, not any application or operating system may access the clear key directly. Thus, the key is completely shielded against unauthorized access.

Additionally, the proposed method is fast not requiring a substantial overhead resulting in performance degradation. In other words, the method is "at CPU speed"; this may stand in contrast to standard HSM encryption speed requiring constantly input/output (I/Os), which may not be acceptable in terms of additional performance requirements.

Moreover, with the exception of the single secret, all information to interpret the data must be available on the block storage device. This primary key must never be visible or accessible to the operating system. And, the access to the single secret is not dependent on a specific system configuration like a specific card slot used for the HSM in additional specialized hardware, or the like.

Furthermore, the proposed method and system is compatible with existing clear key encryption/decryption methods and systems.

In the following additional embodiments of the method and system will be described.

According to one preferred embodiment of the method, the clear key may be inaccessible by an operating system being executed on the computer system. By making the clear key for encryption and decryption of the data on the block storage device only available to the CPU or firmware of the computing system, the clear key may never be accessible by the operating system in the memory of the computing system. This increases the data security significantly. Security holes in operating systems may become useless for data security breaches based on stolen keys.

According to one advantageous embodiment of the method, the central processing unit may use the protected key to encrypt and decrypt data—in particular for reading/writing from/to the disk, i.e., the block storage device—by using the clear key referred to by the protected key in a cipher method. This may apply to any cipher method used. Thus, the protected key read/write method may be implemented in full analogy to a clear key read/write method using the same set of interfaces.

According to one additionally preferred embodiment of the method, the protected key may be a clear key wrapped by a master key which may be accessible by the central processing unit only and which may be inaccessible by an operating system—e.g., the UNIX operating system—of the computer system. Hence, the clear key may not be available in the memory of the computing system and thus, not available for the operating system or other programs.

According to one permissive embodiment of the method, the master key may be stored in the CPU or a memory area of the computer system. Again, such a memory area may not be mapped to the normal address space for applications and the operating system. It may be a protected memory area only accessible by the central processing unit and/or firmware. Thus, there may be no risk of non-allowed access to the master key or the clear key.

According to one useful embodiment of the method, the protected key may be associated with the block storage device. This way, a defined relationship between the protected key and the related volume, i.e., block storage device may be guaranteed, and the secure key is not needed for encryption and decryption as long as the relationship remains valid.

According to one advantageous embodiment of the method, reading data from the block storage device or writing data to the block storage device may comprise a protected key read/write method. The protected key may be decrypted in the CPU via a master key (as for example in International Business Machine's z System computers) or it may be a handle referencing a clear key stored in memory not accessible to the operating system.

According to an additionally advantageous embodiment of the method, the protected key read/write method may comprise reading data from the block storage device and decrypting the data by the central processing unit using the clear key referred to by the protected key, or encrypting the data by the central processing unit using the clear key referred to by the protected key and writing data to the block storage device. This way, the data may always be stored in an encrypted form on the block storage device using a known encryption method. Thus, the proposed secure key method may be transparent to underlying additional cipher methods, i.e., protected key methods.

According to one preferred embodiment of the method, the type indicator may also be indicative of a crypto module to be used. Hence, the data required to identify a related crypto module is available on the block storage device and thus accessible together with the secure key. Therefore, the proposed method does not require extra parameters for encrypt/decrypt layer and the read/write method to control the usage of secure keys.

According to one permissive embodiment of the method, a decrypt/encrypt layer of the block storage device may comprise a secure key crypto module—in particular, e.g., for "sk_AES" which may stand for the "secure key AES"— besides a standard crypto module, e.g., for the classics like "AES" (Advanced Encryption Standard). By embedding the secure key crypto module into the decrypt/encrypt layer of the block storage device, only this layer needs to be enhanced in order to use the secure key method; no other additional overhead may be required. Consequently, a selection between the secure key crypto module and the standard crypto module may be made based on the type indicator. More than one secure key crypto module may be available as part of the decrypt/encrypt layer in order to support different secure key methods. It may be noted that the secure key method may be related to each protected key method.

According to one additionally permissive embodiment of the method, the associating the block storage device with the hardware secure module may comprise searching for a hardware security module associated to the type indicator. Thus, if several hardware security modules are available in the computing system, the method may ensure that the hardware security module relating to the secure key may be identified. No special considerations need to be reflected.

In the same way, and according to a further embodiment, the associating the block storage device to the hardware secure module may comprise searching for a hardware security module associated with the secure key. Thus, if meaningful results may be generable by decrypting with the secure key, the correct hardware security module may be identified.

Additionally, it may be useful—in a specific embodiment—that each secure key may comprise a hardware security module indicator of the hardware security module it is usable for. For example, the indicator may be the hash of the master key used by the hardware security module. This may ease the process of associating a secure key to a hardware security module. Hence, an extended secure key may comprise two parts: the secure key itself and the indicator. Both parts may be combined into one data item with a predefined data structure.

According to one additional embodiment, the method may—in case the central processing unit indicates that the protected key may be invalid—comprise that the secure key may be converted into a new protected key, and the new protected key may then be used in place of the invalid protected key. This may be required because if the master key in the CPU may have changed over time the hardware security module needs to know the new master key. The master key may, e.g., be changed during every reboot of the computer system and the operating system shall be suspended before the reboot and shall be resumed after the reboot.

In the following, a detailed description of the figures will be given. All instructions in the figures are schematic. Firstly, a block diagram of an embodiment of the inventive method for protecting an encryption key for a block storage device is given. Afterwards, further embodiments as well as embodiments of the related system for protecting an encryption key for a block storage device will be described.

FIG. 1 shows a block diagram of an embodiment of the computer-implemented method 100 for protecting an encryption key for a block storage device—e.g., a disc volume storing the daytime blocks. The method comprises reading, 102, from a superblock of the block storage device (a) a secure key. The secure key refers to a clear key which is only accessible by a hardware security module. Additionally, (b) a type indicator is read. It indicates that the secure key refers to the clear key which is only accessible using the hardware security module. This indicator may stand for the fact that the HSM encrypted clear key may have been converted into a secure key comprising the clear key. It may be noted that the hardware security module may cooperate with firmware, e.g., of the CPU when accessing the secure key referring to the clear key.

The method 100 comprises additionally associating, 104, the block storage device with the hardware security module, and converting, 106, the secure key into a protected clear key using the hardware security module wherein the protected key refers to the clear key accessible by a central processing unit of a related computer system. It may be noted that the conversion may also be possible by the CPU. In this case, the HSM sends the clear key to CPU via "secret channel", which may require cooperation of the hardware security module and the CPU and not the normal operating system or any other application. Then the CPU may wrap the clear key with its own master key.

FIG. 2 shows a block diagram of a typical end-to-end data encryption method 200 used for block storage devices, e.g., disks 212 or hard drives. The hard drive 212 may store the encrypted data. In a special area 214 a key 216—e.g., a clear key wrapped by a key derived from a password—may be stored which may be used to decrypt the data on the disk 212. The encryption/decryption process may be performed in the encryption/decryption layer 206. Here, firstly the clear key 215 may be isolated by decrypting the wrapped clear key 216. In order to do so, the key 210 to decrypt the wrapped clear key 216 may be made available by, e.g., terminal 208 input. It may, e.g., be derived from a password. The encryption/decryption layer 206 may be part of the storage device management environment or, it may be part of the operating system 202. In any case, the operating system 202 may interoperate with the encryption/decryption layer 206 in order to make decrypted data available to the application 204 or to write encrypted data from the application 204 to the disk 212.

FIG. 3 shows an implementation-near block diagram 300 of an embodiment of the proposed method. In this case, the secure key 216a is stored in the superblock area 214 of the disk in which normal storage area 212 the encrypted data are stored. The encryption/decryption layer 206 is enabled to convert the secure key 216a into a protected key 217a using a hardware security module 218 with HSM master key 220 and the CPU 224 with CPU master key 222. Now the en/decryption layer can ask the CPU to encrypt or decrypt data with the protected key 216a.

It may be noted, that the special area 214 of the block storage device may be the superblock of the block storage device comprising the secure key 216a and related type information which describes the secure key as a hardware security module key that can be converted into a protected key by the HSM.

FIG. 4 shows a block diagram of an embodiment of the adapted encryption/decryption layer 400 comprising a new crypto module 206 for the protected key in addition to the already available crypto module 204 used by number protected key methods. In this example, the encryption method AES (Advanced Encryption Standard) is used for illustration purposes. The "algo-name" 402 stored in the superblock 214 of the block storage device may be indicative of the fact that a new crypto method is used requiring a new crypto module to compute crypto operations with a secure key method. A related hardware security module (HSM) may be selected by the new crypto module 404 based on the "algo-name" or simply by a similar indicator for the algorithm to be used with the related HSM.

This way, the here proposed, enhanced method may also be used for standard encryption/decryption methods without any compromise. Thus, the new method stays compatible with classical clear key and protected key solutions. It may be noted that the algorithm name "sk_AES" may here be used as an example of an indicator of the fact that the AES key may be secured using the secure key method, as described above. Similarly, an algorithm name "AES" may indicate that a standard module 406 for clear key AES encryption shall be used. The proposed method may be combined with any other encryption/decryption method useful for encrypting stored data on a block storage device, e.g., in the UNIX-like computing environment.

FIG. 5 shows another block diagram 500 with steps useful for the proposed method 100. Firstly, the secure key algorithm name and the key material are read, 502, from the volume. Then, 504, a search for a corresponding crypto module is started. In a next step, 506, the volume is associated with the crypto module based on the secure key algorithm name. Then, the process waits, 508, for a read or writes access to the volume or disk. Depending on a read or write access to the volume, 510, the data are decrypted or encrypted—corresponding to a read or a write access—from/to the volume using the secure key method implemented in the associated crypto module (compare FIG. 4).

FIG. 6 shows a block diagram of an initialization process 600 for the secure key algorithm module. Triggered by the indicator, a first available HSM may be accessed 602. For this, it is determined whether an HSM is available, 604. In case no HSM is available, the process ends and an error message 605 may be generated. In the other case—"Y"—the read key material from the superblock is probed, 606, with the HSM. If the HSM does not match with a key material—branch "N" of the determination step 608—an access to a next available HSM is tried, 610. In case of "Y" in the last determination step (reference numeral 608) the HSM is asked to convert, 612 the secure key into the protected key. This protected key is then associated, 614, to the volume of the block storage device. For this, the master key needs to be available to the HSM and the HSM may need to communicate with the CPU on a path not accessible to normal programs like operation systems and applications.

FIG. 7 shows a block diagram of a related system 700 for protecting an encryption key for a block storage device. The system 700 comprises a reading unit 702 which is adapted for reading the secure key from a superblock of the block storage device. The secure key refers to a clear key only accessible by a hardware security module. Additionally, the reading unit 702 is adapted for reading a type indicator indicating that the secure key refers to the clear key which is only accessible by the hardware security module. An additional associating module 704 is adapted for associating the block storage device to the hardware security module. Furthermore, a conversion module, 706, is adapted for converting the secure key into a protected clear key by the hardware security module. The protected key refers to the clear key accessible by a central processing unit of a related computer system. For this access, a master key in the CPU is required to unwrap the clear key.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

Program/utility 814, having a set (at least one) of program modules 816, may be stored in memory 804 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the system 700 for protecting an encryption key for a block storage device may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for protecting an encryption key for a block storage device, said method comprising
 reading from a superblock of said block storage device:

a secure key, wherein said secure key refers to a clear key that is only accessible by a hardware security module of a plurality of hardware security modules, and a type indicator indicating that said secure key refers to said clear key, wherein said type indicator also indicates that the secure key requires a related secure key algorithm that is executed on a dedicated hardware security module of the plurality of hardware security modules, associating said block storage device with said hardware security module, wherein said associating said block storage device to said hardware security module comprises searching the plurality of hardware security modules to identify the dedicated hardware security module based at least in part on a correspondence to said type indicator, and converting said secure key into a protected key using said hardware security module, wherein converting said secure key into said protected key comprises sending, by the hardware security module and via a secure channel, the clear key to a central processing unit of a related computer system that generates the protected key by wrapping the clear key with a master key, and wherein said protected key refers to said clear key and is only accessible by the central processing unit of the related computer system.

2. The method according to claim 1, wherein the clear key is inaccessible by an operating system being executed on said computer system.

3. The method according to claim 1, wherein said central processing unit uses said protected key to encrypt and decrypt data by using said clear key referred to by said protected key in a cipher method.

4. The method according to claim 1, wherein the master key is accessible by said central processing unit and inaccessible by an operating system of said computer system.

5. The method according to claim 4, wherein the master key is stored in the central processing unit or a memory area of said computer system.

6. The method according to claim 1, wherein said protected key is associated with said block storage device.

7. The method according to claim 1, wherein reading data from said block storage device or writing data to said block storage device comprises a protected key read/write method.

8. The method according to claim 7, wherein said protected key read/write method comprises:
reading data from said block storage device and decrypting said data by said central processing unit using said protected key, or
encrypting said data by said central processing unit using said protected key and writing data to said block storage device.

9. The method according to claim 1, wherein the secure key and the hardware security module are stored in a decrypt/encrypt layer of said block storage device.

10. The method according to claim 1, wherein said hardware security module is a protected key crypto module, and wherein the type indicator indicates that the protected key crypto module is to be selected in lieu of a standard crypto module.

11. The method according to claim 1, wherein said associating said block storage device to said hardware security module comprises searching for said hardware security module based at least in part on a correspondence to said secure key.

12. The method according to claim 11, wherein said secure key comprises a hardware security module indicator of said hardware security module said secure key is usable for.

13. The method according to claim 1, further comprising:
receiving an indication from said central processing unit that said protected key is invalid;
converting said secure key into a new protected key; and
using said new protected key in place of said invalid protected key.

14. A system for protecting an encryption key for a block storage device, said system comprising:
a reading unit adapted for reading from a superblock of said block storage device:
a secure key, wherein said secure key refers to a clear key that is only accessible by a hardware security module of a plurality of hardware security modules, and
a type indicator indicating that said secure key refers to said clear key, wherein said type indicator also indicates that the secure key requires a related secure key algorithm that is executed on a dedicated hardware security module of the plurality of hardware security modules;
an associating module adapted for associating said block storage device to said hardware security module, wherein said associating said block storage device to said hardware security module comprises searching the plurality of hardware security modules to identify the dedicated hardware security module based at least in part on a correspondence to said type indicator; and
a conversion module adapted for converting said secure key into a protected key using said hardware security module, wherein converting said secure key into said protected key comprises sending, by the hardware security module and via a secure channel, the clear key to a central processing unit of a related computer system that generates the protected key by wrapping the clear key with a master key, and wherein said protected key refers to said clear key and is only accessible by the central processing unit of the related computer system.

15. The system according to claim 14, wherein said clear key is inaccessible by an operating system being executed on said computer system.

16. The system according to claim 15, comprising a memory adapted for storing the master key, and wherein said central processing unit or said memory stores the master key.

17. The system according to claim 14, wherein said central processing unit is adapted for using said protected key for an encryption and a decryption of data by using said clear key referred to by said protected key in a cipher method.

18. A computer program product for protecting an encryption key for a block storage device, said computer program product comprising a computer readable storage medium having program instructions embodied therewith, said program instructions being executable by one or more computing systems to cause said one or more computing systems to
read from a superblock of said block storage device:
a secure key, wherein said secure key refers to a clear key that is only accessible by a hardware security module of a plurality of hardware security modules, and
a type indicator indicating that said secure key refers to said clear, wherein said type indicator also indicates that the secure key requires a related secure key algorithm that is executed on a dedicated hardware security module of the plurality of hardware security modules;

associate said block storage device to said hardware security module, wherein said associating said block storage device to said hardware security module comprises searching the plurality of hardware security modules to identify the dedicated hardware security module based at least in part on a correspondence to said type indicator, and convert said secure key into a protected key using said hardware security module, wherein converting said secure key into said protected key comprises sending, by the hardware security module and via a secure channel, the clear key to a central processing unit of a related computer system that generates the protected key by wrapping the clear key with a master key, and, wherein said protected key refers to said clear key and is only accessible by the central processing unit of the related computer system.

* * * * *